United States Patent [19]
Flater

[11] Patent Number: 6,092,825
[45] Date of Patent: Jul. 25, 2000

[54] FLATBAR FIFTH WHEEL RELEASE HANDLE

[75] Inventor: James H. Flater, Holland, Mich.

[73] Assignee: Holland Hitch Company, Holland, Mich.

[21] Appl. No.: 09/172,827

[22] Filed: Oct. 15, 1998

[51] Int. Cl.[7] .................................................. B62D 53/08
[52] U.S. Cl. .......................................... 280/433; 280/434
[58] Field of Search .................................... 280/433, 434, 280/435, 436, 437

[56] References Cited

U.S. PATENT DOCUMENTS

| | | | |
|---|---|---|---|
| 4,721,323 | 1/1988 | Czuk et al. | 280/433 |
| 4,871,182 | 10/1989 | Altherr et al. | 280/434 |
| 4,949,183 | 8/1990 | Benson et al. | 280/434 |
| 5,028,067 | 7/1991 | Madura | 280/433 |
| 5,257,796 | 11/1993 | Thorwall et al. | 280/434 |
| 5,988,665 | 11/1999 | Terry et al. | 280/434 |
| 5,988,666 | 11/1999 | Flater | 280/434 |

FOREIGN PATENT DOCUMENTS

671936 A5  10/1989  Switzerland ........................... 280/434

*Primary Examiner*—J. J. Swann
*Assistant Examiner*—J. Allen Shriver
*Attorney, Agent, or Firm*—Price, Heneveld, Cooper, DeWitt & Litton

[57] ABSTRACT

A fifth wheel hitch, actuator and lock assembly comprising a bifurcated hitch plate, a kingpin engagement jaw movable between a closed position for engaging a kingpin and an open position for releasing a kingpin, a lever coupled with the jaw and operatively shiftably attached for movement of the jaw from the closed position to the open position when operatively shifted, a release handle attached to the lever and movable for shifting the lever to thereby move the jaw to the release position, the release handle having an outer end with a hand grip thereon, a pivotal lock on the release handle movable between an extended condition and a retracted condition, the pivotal lock in the extended condition being positioned to lockingly engage the hitch plate to prevent the release handle from moving to shift the lever, and in the retracted position to allow the release handle to move to shift the lever, a lock actuator extending between the pivotal lock and hand grip, and movable to pivot the pivotal lock from extended condition to retracted condition, and a biasing spring positioned to bias the pivotal lock to extended condition.

16 Claims, 2 Drawing Sheets

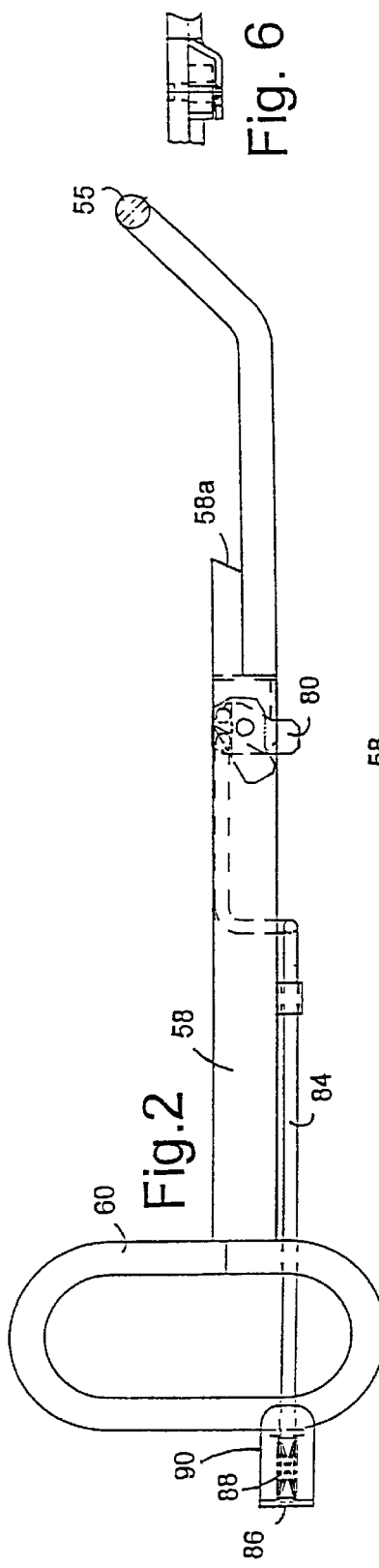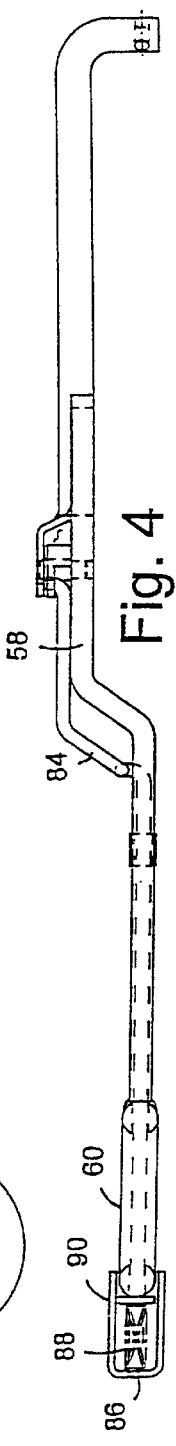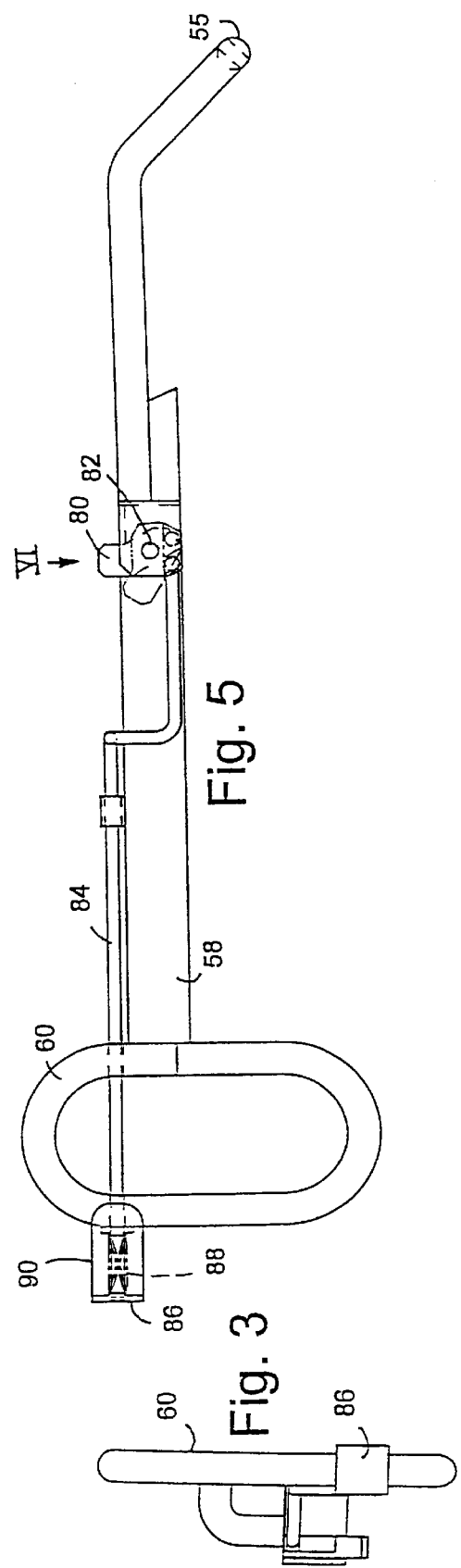

FLATBAR FIFTH WHEEL RELEASE HANDLE

BACKGROUND OF THE INVENTION

This invention relates to fifth wheel hitches, and particularly to a hitch release handle mechanism. The European standard for fifth wheel hitches requires that each release handle have either a manual or an automatic locking system to assure that the handle is securely locked in a specific condition when the hitch is closed and locked after coupling with a trailer. Typically this is performed by a spring pulling the handle into a notch in the handle and then secured in that location with a steel clip attached to the fifth wheel by a chain. To disengage the handle lock mechanism, the driver must first manually remove the clip by reaching in under the fifth wheel and detaching it, then moving the handle sideways to disengage the safety latch and finally pulling the handle to release the hitch. Such a mechanism has significant disadvantages.

SUMMARY OF THE INVENTION

An object of this invention is to provide a hitch release handle lock mechanism that allows the operator, typically the driver, to release the handle lock with movement of a push button on the handle, and then release the hitch jaw by pulling on the release handle. There is no need to remove a separate clip or reach in under the fifth wheel to detach anything. Upon locking of the hitch to a trailer kingpin, the handle is biased inwardly which results in it moving through an orifice in the hitch body wall, causing a handle lock to also move through the orifice and then spring outwardly behind the hitch body wall to lock the handle inwardly. When the operator wishes to release the fifth wheel jaw, he merely grasps the handle and pushes the button with his thumb to rotate the spring lock into the unlocked position, and then pulls the handle to unlock the fifth wheel. When he releases the button, the locking device springs back to its ready to couple position, providing the locking feature for the next coupling action. During coupling, closure of the jaw allows the handle to be biased inwardly by a spring. This inward movement of the handle moves it inwardly of the orifice, the handle lock pivoting as it passes through the orifice and then springing back to its locking position behind the hitch body wall so that the handle cannot be accidentally pulled or otherwise moved to its outward release condition.

These and other features, advantages and objects of the present invention will be further understood and appreciated by those skilled in the art by reference to the following specification, claims and appended drawings.

BRIEF DESCRIPTION OF THE DRAWINGS

FIG. 2 is a view of the novel handle mechanism forming part of the assembly in FIG. 1;

FIG. 3 is an end elevational view of the mechanism in FIG. 2;

FIG. 4 is an edge elevational view of the mechanism in FIGS. 2 and 3;

FIG. 5 is a top elevational view of the mechanism in FIGS. 2–4; and

FIG. 6 is a fragmentary view of the handle lock in FIG. 5 taken from the direction VI.

DETAILED DESCRIPTION OF PREFERRED EMBODIMENT

Figure 1:
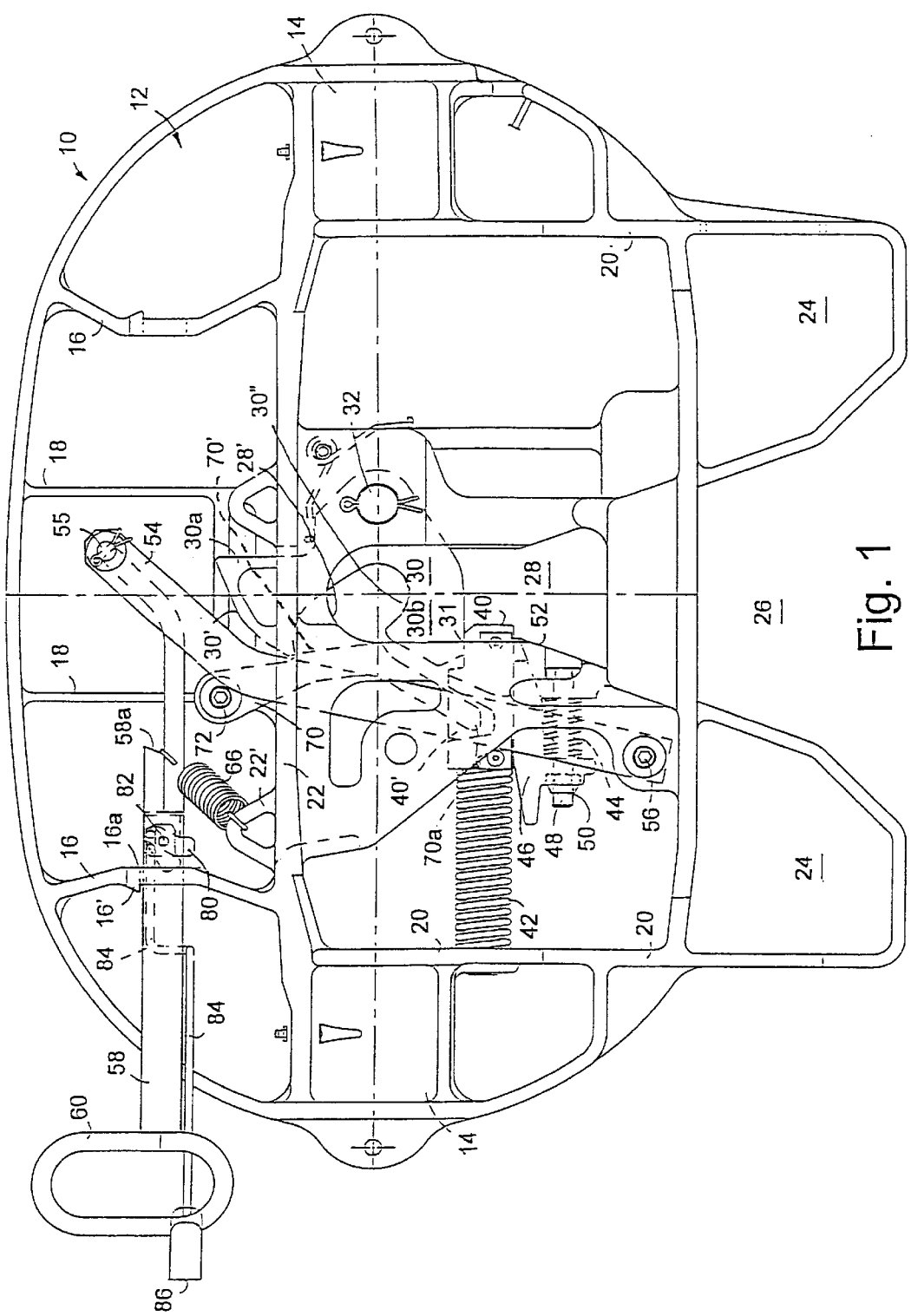
FIG. 1 is a view of the underside of a fifth wheel hitch employing the novel handle mechanism.

Referring now specifically to the drawings, the fifth wheel hitch shown is basically of the type described in U.S. Pat. No. 5,257,796 which is incorporated by reference herein, but using a special handle lock which normally prevents the handle from releasing the hitch until the handle itself is unlocked to enable it to be pulled to the hitch release condition. To enable a clear understanding of the entire mechanism, the hitching apparatus will first be described, and then the added unique features of this invention will be explained relative thereto.

The fifth wheel hitch 10 includes a top plate 12 of generally conventional type, having a convex forward end and a bifurcated rear, as well as a pair of laterally spaced trunnions 14 for pivotally mounting the top plate and thereby enabling it to tilt from the true horizontal but remain in a generally horizontal orientation. In FIG. 1 is illustrated the bottom, i.e., underside, of the top plate which includes a plurality of downwardly protruding fore-to-aft ribs or walls 16, 18, 20, and transverse rib or wall 22, all of which rigidify the hitch and also support and cooperate with other components in a manner to be described hereinafter. The top surface of plate 12 may be a conventional slide surface of steel or lubricious material. The rear end has bifurcated portions 24 which define a forwardly extending mouth 26 therebetween, terminating in a dead-end throat 28 to receive the kingpin.

Adjacent to the throat 28 is a pivotal, generally V-shaped lock element or jaw 30 bifurcated into a first forward 30a and second rearward branch 30b and pivotally mounted at the apex between these two branches to a vertical pivot pin 32 fixed to plate 12. Branch 30b is a locking branch while branch 30a will be called a camming branch. Pivot pin 32 is laterally offset from the dead-end portion of throat 28. Jaw 30 pivots on pin 32 which is offset from throat 28, to move between the closed lock position across the throat as shown in FIG. 1 and a fully open position clear of the throat. Lock element 30 has a concave kingpin lock surface 30" between branches 30a and 30b to cooperate with the concave forward end 28' of throat 28 and thereby cylindrically surround the neck or shoulder of a kingpin. Branch 30b is generally rearwardly of the axis of pivot pin 32 while branch 30a is generally forwardly of this axis, except in the fully open position of the lock element.

The first forward branch 30a comprises a protruding finger which has a camming surface 30' near the outer end thereof. The second rearward branch 30b includes the concave kingpin lock surface 30" on its inner face and a lock plunger engagement surface 31 on its outer rear surface. A locking plunger 40 is laterally reciprocal from a retracted condition against the bias of a coil spring 42 around the shaft of the plunger and between the plunger head and rib 20. In the fully extended position of the plunger, it engages surface 31 of lock element 30 to hold this lock element in closed position around the kingpin. Spring 42 biases the plunger to this extended locking condition. Any wear between the plunger and the lock element is compensated for by a wedge 46 biased by spring 44 toward a wedging action on the plunger, in conventional fashion. Wedging element 46 has an L-shaped configuration with one flange thereof being positioned on stud 48, and with nut 50 limiting movement of the wedging element with a retracting plunger. The wedging element 46 rides against a sloping surface of fixed wedge 52 in conventional fashion.

A hitch release arm or lever 54 is pivotally mounted on vertical pin 56 to top plate 12. This release arm extends through a slot in plunger 40 such that retraction of plunger 40 causes pivoting of release arm 54 in one direction and extension causes pivoting of release arm 54 in the opposite direction. In the illustrated embodiment, the unit is a so-called "right-handed" unit with the release handle 54 pivotally mounted at its forward end. The invention will therefore be described relative to the right-handed model. If a left-handed unit is employed, release arm 54 will be pivotally mounted between its ends and extend out the opposite side of the hitch from that depicted, so that in either version a pulling action on the release handle will cause release arm 54 to pivot in the same way. A left-handed unit is depicted in referenced U.S. Pat. No. 5,257,796. These are equivalent arrangements.

In the right-handed version illustrated, the rearward end of release arm 54 is pivotally attached to plate 12 as noted, while the opposite forward end is pivotally engaged at pin 55 to an elongated release handle 58. Release handle 58 extends laterally outwardly beyond plate 12 to allow manual grasping of grip 60 mounted on the outer end of handle 58. Handle 58 extends through a slot, i.e., orifice, 16a in wall 16 and has a notch engageable with the wall or flange. More specifically, unlock position notch 58a is slanted and engageable with a like slanted projection 16' on the outer edge of slot 16a in wall 16, to retain the handle in engaged hitch release position with the wall until the handle is moved slightly linearly outwardly, sufficient for coil tension spring 66 to pull handle 58 away from extension 16' and reset the lock. Coil spring 66 has one end attached to handle 58 at notch 58a and the opposite end attached to ear 22' of rib 22. When handle 58 is in its laterally outward, unlocked, i.e., released, position, spring 42 biases handle 58 inwardly to retain notch 58a on flange protrusion 16'.

Also pivotally mounted to top plate 12 is a conventional elongated cam arm 70. It is positioned between lock element 30 and release arm 54. This cam arm is pivotally mounted at its forward end on a pivot pin 72. It has a generally dogleg-shaped configuration with a cam follower surface 70' intermediate its ends, and has its rearward end projecting into a slot 40' in plunger 40, to move with the plunger and release arm 54. Thus, cam arm 70 will be moved with the plunger when the release arm and release handle are manually actuated to unlock the locking jaw element 30. Likewise, when plunger 40 is biased by spring 42 to an extended position, release arm 54 and cam 70 will move therewith. Further, the cam also has a relationship to locking element 30, as well as to the release arm and handle as just noted. More specifically, cam surface 30' on branch 30a of lock element 30 will, when lock element 30 is rotated, engage cam surface 70' of cam element 70 to thereby shift the cam element away from the throat of the hitch, tending to retract plunger 40 slightly and also to shift release arm 54 and release handle 58. These above-described components operate together during a hitching operation to a kingpin, and also during the unhitching operation.

When the fifth wheel hitch is in the coupled locked position shown in FIG. 1, the lock cannot be released simply by pulling on grip 60 of release handle 58. This is because of a novel handle lock 80. More specifically, lock 80 is pivotally mounted at pin 82 to handle 58 intermediate the ends of handle 58. Lock 80 can pivot from an extended condition transverse to handle 58 as shown in solid lines, and a collapsed condition within the lateral boundaries of handle 58 as shown by phantom lines in FIGS. 1, 2 and 5. Connected to pivotal lock element 80, offset from pivot pin 82, is an elongated release rod 84 extending out to grip 60 and specifically to a push button 86 on grip 60. A compression spring 88 in the push button housing 90 biases push button 86 to an outward position, thereby causing handle lock 80 to be biased to its transverse protruding, i.e., extended, condition shown in solid lines. Depression of thumb button 86 against the bias of compression spring 88 while gripping grip 60 shifts the rod 84 inwardly, thereby pivoting lock element 80 about pin 82 to the release position shown in phantom lines, i.e., within the lateral confines of the side edges of handle 58. Where handle 58 extends through opening 16a in wall 16, there is only slight clearance along the lateral edges of handle 58 relative to opening 16a. In other words, opening 16a is just slightly larger than handle 58 and not sufficiently large as to allow both the handle and the transverse lock element 80 to move through orifice 16a when the lock element is in its extended condition. Thus, pulling on grip 60 and handle 58 without depressing push button 86 causes the handle lock element 80 to abut the inside face of wall 16 of the fifth wheel hitch body, preventing the release handle from being effectively pulled.

Depression of push button 86 shifts rod 84 and lock 80 to its pivotal position within the lateral confines of release handle 58 and the confines of orifice 16a, allowing grip 60 and release handle 58 to be pulled because lock element 80 can move through orifice 16a to the outside of rib 16.

During an unhitching operation, the conventional kingpin will be in the dead-end of throat 28, secured between concave throat surface 28' and concave kingpin lock surface 30", with plunger 40 being in extended condition engaging surface 31 of the lock element. In this locked condition, release handle 58 is in its inward position. In this position of release arm 54, plunger 40 is in full engagement with surface 31, biased by spring 42, to retain the fifth wheel in locked relationship with the kingpin. The closed locked condition is plainly and quickly visible to the operator by a glance at the position of the release handle.

To unlock the hitch, the operator manually grasps grip 60, depresses push button 86 to shift rod 84 and pivot lock 80 from its solid line locking position out of alignment with orifice 16a to its phantom line position in alignment with orifice 16a, pulls release handle 58 laterally to an extended condition, and then shifts release handle 58 toward the front of the hitch to engage notch 58a with projection 16' which prevents tension spring 66 from pulling release handle 58 away from its engagement with wall 16. This pulling action pivots release arm 54 about its pivot pin 56, thereby retracting plunger 40 from throat 28 of the fifth wheel top plate, against the bias of compression coil spring 42. The truck tractor then can begin to move away from the trailer to withdraw the upwardly oriented fifth wheel hitch from the depending kingpin on the trailer. The kingpin thus pivots lock element 30 about its pivot pin 32. As lock element 30 pivots rearwardly to open, cam surface 30' on finger 30a engages cam follower surface 70' on cam arm 70, causing the rearward end 70a of cam arm 70 to retract plunger 40 against its coil spring. As lock element 30 moves further toward its fully open position, cam surface 30' moves past the convex center of cam follower surface 70'. When this occurs, the plunger carries release arm 54 and release handle 58 with it, pivoting the release arm about its pivot pin, first slightly outwardly to move handle notch 58a outwardly away from protrusion 16' so that tension spring 66 can then pull handle 58, including notch 58a, into alignment with orifice 16a, and then retracting release handle 58 inwardly. The biasing pull of spring 66 in this manner keeps the handle off notch 58a to allow the hitch to couple to the next trailer. When cam surface 30' moves past the center of surface 70', this allows cam arm 70 to be moved back toward the throat under the influence of compression spring 42 on plunger 40. The lock is then fully open allowing full release of the kingpin. The open, unlocked condition of the hitch is readily and quickly visible from the position of handle 58.

Moreover, the over center position of cam surface 30' of jaw 30 relative to cam arm 70, and specifically surface 70' thereof, causes the lock to remain fully open and not accidentally close so that another entering kingpin, during attempted hookup, will not damage a closed lock element, but rather will allow and assure smooth hookup.

During the hookup operation, the elements move generally in reverse to what has been described above. More specifically, the entering kingpin engages the back side of finger 30a, rotating locking element 30 about its pivot pin, simultaneously causing cam surface 30' to move along cam follower surface 70' on cam arm 70. As this occurs, the nose of branch 30b ultimately engages the end of the plunger to give it a slight further retraction by pushing it laterally, following which the nose of branch 30b moves past the plunger, allowing the plunger to slam into its fully extended locking condition depicted in FIG. 1. During inward movement of handle 58, lock 80 pivots on pin 82 into alignment with orifice 16a to pass through opening 16a and then spring back to its extended condition transverse to handle 58 due to the bias of spring 88 in housing 90.

The above description is considered that of the preferred embodiment only. Modifications of the invention will occur to those skilled in the art and to those who make or use the invention. Therefore, it is understood that the embodiment shown in the drawings and described above is merely for illustrative purposes and not intended to limit the scope of the invention, which is defined by the following claims as interpreted according to the principles of patent law, including the doctrine of equivalents.

The invention claimed is:

1. A fifth wheel hitch, actuator and lock assembly comprising:

a bifurcated hitch plate;

a kingpin engagement jaw movable between a closed position for engaging a kingpin and an open position for releasing a kingpin;

a lever coupled with said jaw and operatively shiftably attached to said assembly for movement of said jaw from said closed position to said open position when operatively shifted;

a release handle attached to said lever and movable for shifting said lever to thereby move said jaw to said open position;

said release handle having an outer end with a hand grip thereon;

a pivotal lock on said release handle, movable between an extended condition and a retracted condition, said pivotal lock in said extended condition being positioned to lockingly engage said hitch plate in a manner to prevent said release handle from moving to shift said lever, and in said retracted position to allow said release handle to move to shift said lever;

a lock actuator extending between said pivotal lock and said hand grip, and movable to pivot said pivotal lock from said extended condition to said retracted condition; and a biasing spring positioned to bias said pivotal lock to said extended condition.

2. The fifth wheel hitch, actuator and lock assembly in claim 1 wherein said release handle is a manual pull handle, shiftable between an inward position with said jaw in said closed position, and an outward position with said jaw in said open position, and a spring biasing said release handle to said inward position.

3. The fifth wheel hitch, actuator and lock assembly in claim 2 wherein said release handle has a latch for temporarily retaining said release handle in said outward position.

4. The fifth wheel hitch, actuator and lock assembly in claim 1 wherein said lock actuator has an actuator button at said hand grip.

5. The fifth wheel hitch, actuator and lock assembly in claim 1 wherein said plate has a wall containing an orifice, said release handle extends through said orifice, and said pivotal lock is movable between an extended position out of alignment with said orifice to abut said wall and prevent said release handle from moving to said extended condition, and a retracted position in alignment with said orifice to allow said pivotal lock to move through said orifice and allow said release handle to move to said extended condition.

6. The fifth wheel hitch, lock and actuator in claim 5 wherein said lock actuator has an actuator button at said hand grip.

7. The fifth wheel hitch, lock and actuator in claim 6 wherein said actuator button is a push button.

8. The fifth wheel hitch, lock and actuator in claim 4 wherein said actuator button is a push button.

9. The fifth wheel hitch, lock and actuator in claim 7 wherein said biasing spring is at said push button.

10. A fifth wheel hitch, actuator and lock assembly comprising:

a bifurcated hitch plate;

a kingpin engagement jaw movable between a closed position for engaging a kingpin and an open position for releasing a kingpin;

a lever coupled with said jaw and operatively shiftably attached to said assembly for movement of said jaw from said closed position to said open position when operatively shifted;

a release handle attached to said lever and movable for shifting said lever to thereby move said jaw to said release position, said release handle having an outer end with a hand grip thereon;

a movable handle lock on said release handle, movable between an extended condition and a retracted condition, said movable lock in said extended condition being positioned to lockingly engage said hitch plate in a manner to prevent said release handle from moving to shift said lever, and in said retracted position to allow said release handle to move to shift said lever;

a lock actuator extending between said pivotal lock and said hand grip, and movable to shift said movable lock from said extended condition to said retracted condition; and a biasing spring positioned to bias said movable lock to said extended condition.

11. The fifth wheel hitch, actuator and lock assembly in claim 10 wherein said release handle is a manual pull handle, shiftable between an inward position with said jaw in said closed position and an outward position with said jaw in said open position, and a spring biasing said release handle to said inward position.

12. The fifth wheel hitch, actuator and lock assembly in claim 11 wherein said actuator has a thumb push button at said hand grip.

13. The fifth wheel hitch, actuator and lock assembly in claim 12 wherein said plate has a wall containing an orifice, said release handle extends through said orifice, and said pivotal lock is movable between an extended position out of alignment with said orifice to abut said wall and prevent said release handle from moving to said extended condition, and a retracted position in alignment with said orifice to allow said pivotal lock to move through said orifice and allow said release handle to move to said extended condition.

14. The fifth wheel hitch, lock and actuator in claim 13 wherein said lock actuator has an actuator button at said hand grip.

15. The fifth wheel hitch, lock and actuator in claim 14 wherein said actuator button is a push button.

16. The fifth wheel hitch, actuator and lock assembly in claim 15 wherein said movable handle lock is pivotally mounted to said release handle.

* * * * *